Sept. 4, 1962  J. W. FORCE, SR  3,052,337
SAFETY LANDING FOR MOVING SIDEWALK
Filed Nov. 28, 1960  2 Sheets-Sheet 1
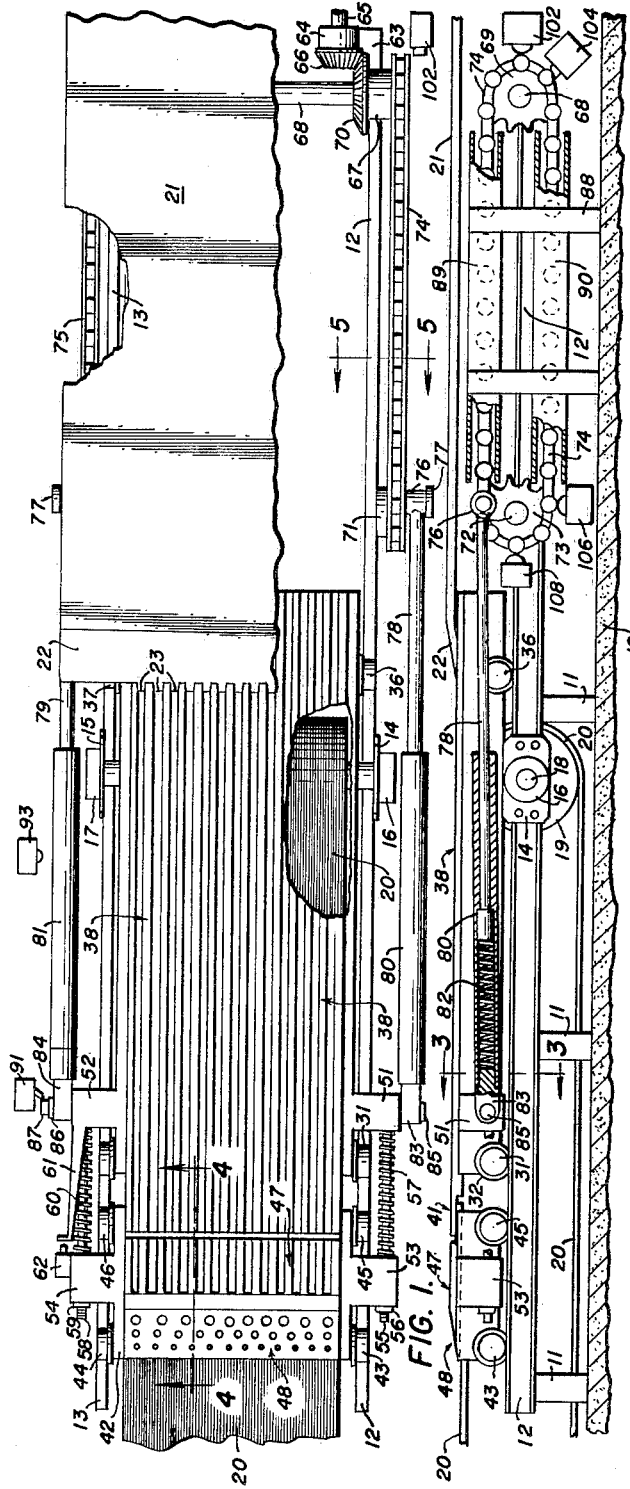
JOHN W. FORCE, SR.
INVENTOR.
BY *Herbert J. Brown*
ATTORNEY Sept. 4, 1962     J. W. FORCE, SR     3,052,337
SAFETY LANDING FOR MOVING SIDEWALK
Filed Nov. 28, 1960     2 Sheets-Sheet 2
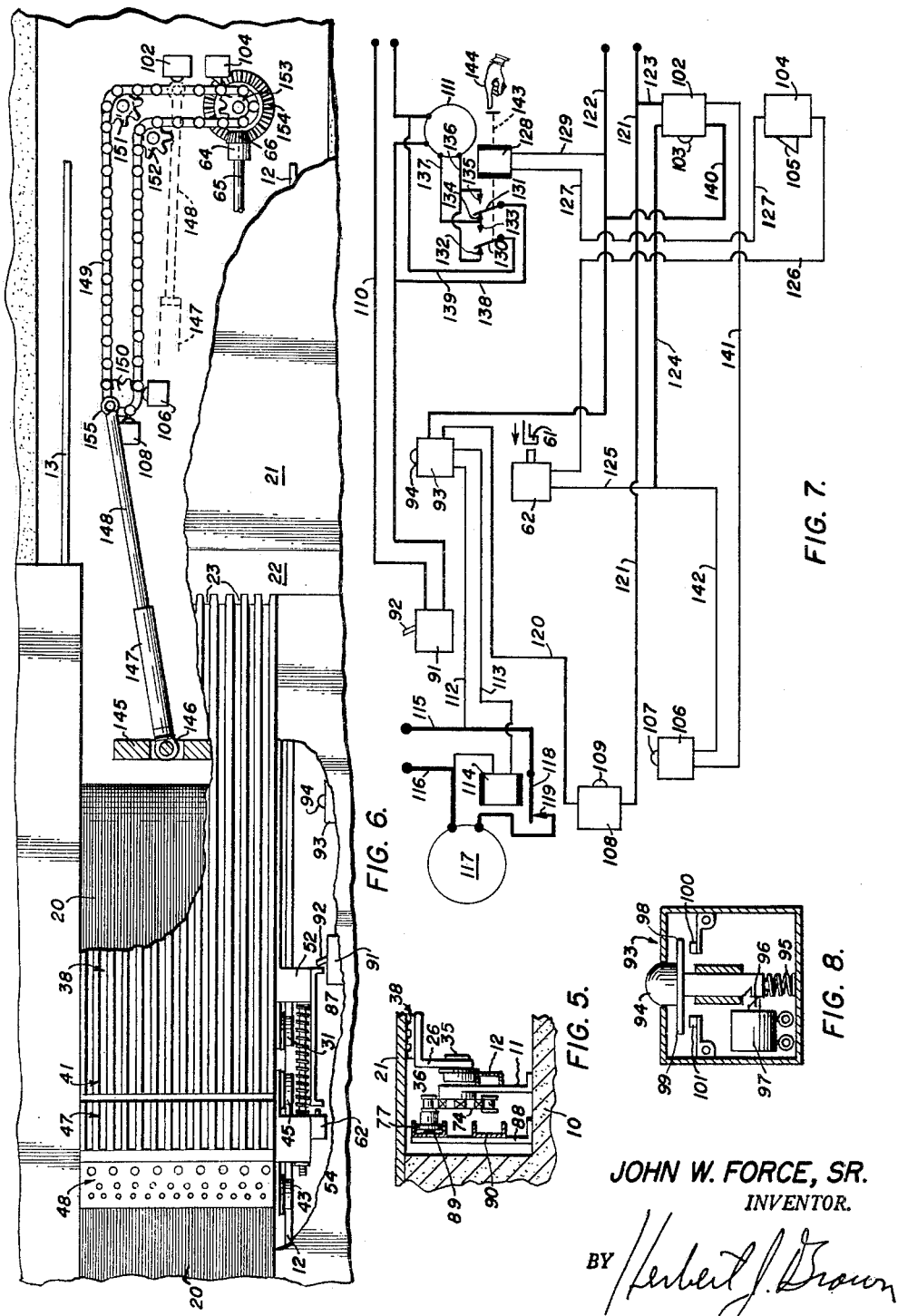
JOHN W. FORCE, SR.
INVENTOR.
BY *Herbert J. Brown*
ATTORNEY United States Patent Office 3,052,337
Patented Sept. 4, 1962

3,052,337
SAFETY LANDING FOR MOVING SIDEWALK
John W. Force, Sr., 1027 S. Beckley, Dallas, Tex.
Filed Nov. 28, 1960, Ser. No. 71,943
7 Claims. (Cl. 198—16)

This invention relates to powered sidewalks and has reference to a safety landing adapted to prevent injury to a pedestrian during exit from a conveyor type tread onto a stationary walkway.

The enthusiastic acceptance and acclaim afforded initial installations of moving sidewalks at air terminals and other public places was subsequently tempered and placed in doubt by news of the death of a small child whose clothing became entangled at the exit of an installation at Love Field in Dallas. As an understandable reaction to this tragedy, requirements for the employment of ushers or monitors and enforcement of strict regulations governing the use of moving sidewalks have fostered distrust in these devices generally and have dissuaded their use by those who might otherwise benefit most from the convenience of the system.

In a continuous belt type moving sidewalk, variations in traffic and consequent peak power requirements prevent the belt and its driving mechanism from being responsive to and failing under loads adequate to injure or kill a user. At an air terminal a moving sidewalk may carry no traffic at all between flights, but arrivals or departures of passenger planes may result in capacity loads for short periods. To reduce possible load fluctuations would so restrict peak traffic flow as to obviate the usefulness of a moving sidewalk. Construction of a severable belt or of a close tolerance joint between a belt and a terminal landing thereof present new maintenance and safety problems to offset the problems they might solve. Actually, the danger is not in the belt itself but in the intersection between the moving belt and the landing of a stationary walkway. There is no relative motion between a passenger of a moving sidewalk and the belt on which he rides because the former carries the latter; the threat to personal safety resides in the relative motion between the belt and the platform and more particularly involves the possibility that a passenger's clothing or foot may become entangled or caught between these two members. Although longitudinal load fluctuations are necessary on the sidewalk itself, there is normally no longitudinal load of consequence on the platform.

Accordingly, an object of the present invention is to provide a safety landing for a moving sidewalk such that the landing is responsive to longitudinal loads and pressures.

Another object of the invention is to provide a safety landing for a moving sidewalk and which landing may yield to longitudinal forces above a preset level to prevent entanglement or entrapment of pedestrians thereon.

A further object of the invention is to provide pressure responsive power means for a safety landing of a moving sidewalk so that the landing may be carried for a limited distance with the sidewalk to permit disentanglement of clothing caught therebetween.

Another object of the invention is to provide a cycle of reverse relative motion between a moving sidewalk and a safety landing to assist disentanglement of the clothing of a passenger who has not otherwise been able to free himself from the device.

A particular object of the invention is to provide a delayed cycle of increased pressure sensitivity in a safety landing of a moving sidewalk to prevent resumption of normal relative displacement between the moving sidewalk and the landing until such time as the clothing of a passenger has been disentangled therewith.

An additional object of the invention is to provide a safety landing for a moving sidewalk and which landing resets itself and recommences operation of the sidewalk once dangers to passengers thereon have been cleared.

These and other objects will become apparent from the following description and the accompanying drawings, wherein:

FIGURE 1 is a fragmentary plan view of a preferred form of the invention.

FIGURE 2 is a partially sectional side elevational view of components shown in FIGURE 1.

FIGURE 3 is an enlarged sectional view taken along line 3—3 in FIGURE 2.

FIGURE 4 is an enlarged perspective view shown partly in section taken approximately along line 4—4 in FIGURE 1.

FIGURE 5 is a fragmentary sectional view taken along line 5—5 in FIGURE 1.

FIGURE 6 is a fragmentary plan view of an alternate form of the invention.

FIGURE 7 is a schematic diagram showing circuits and inter-relationships of various electrical components of the invention.

FIGURE 8 is an enlarged sectional view of an exemplary form of a latching type push button switch as defined herein.

In the drawings and with particular reference to FIGURES 1 and 2, a recessed foundation 10 is constructed as the floor of a trench-like depression and is formed at a level beneath that of a walkway leading to a moving sidewalk. A plurality of vertical posts 11 are regularly spaced from one another and are arranged in two parallel rows upon the foundation 10 with each post projecting and extending upwardly from the foundation a distance slightly less than one-half of the vertical distance from the foundation to the level of the walkway. A pair of rails 12 and 13 are respectively attached to and supported by the rows of posts 11 in a horizontal disposition with the rails being parallel with and laterally spaced from one another. A bracket 14 is attached to one of the rails 12 at the outer side thereof, and a second bracket 15 is correspondingly attached to the other rail 13 in lateral alignment with the first bracket 14. Bearings 16 and 17 are respectively supported by the brackets 14 and 15 in axial alignment with one another and a shaft 18 passing through the rails 12 and 13 is journaled at its opposite ends to the bearings 16 and 17. The shaft 18 carries a drum 19 which is positioned between the tracks 12 and 13 and which drum 19 carries the continuous belt which constitutes the tread of a moving sidewalk. Although the drum 19 is illustrated for purposes of the present invention as a passive member, it is to be understood that the shaft 18 may be coupled to a prime mover through a suitable transmission system such as a gear train, and the drum 19 may be thus utilized as a driving member for the moving sidewalk 20.

A stationary platform 21 is positioned and supported at a level above the forward ends of the rails 12 and 13 and is constructed as a metal plate which spans the trench-like depression defined by the lateral extent of the recessed foundation and is provided with a beveled rearward edge 22 having a plurality of regularly spaced fingers 23 projecting rearwardly and downwardly of the rearward termination of the beveled portion of the stationary platform 21. A box-like carriage 24 comprised of a rectangular deck 25 having downwardly extending lateral side plates 26 and 27 is positioned above and between the rails 12 and 13 and stub shafts 29 and 30 project outwardly and coaxially through the respective lateral side plates near the rearward ends thereon. One stub shaft 29 carries a wheel 31 journaled thereto exteriorly of the carriage 24 and an inner flange 32 is integrally and coaxially constructed with that wheel 31 whereas the other stub shaft 30 is journaled in a like manner to another wheel 33 is exteriorly of the carriage 24, and the second wheel likewise is provided with an inner flange 34. The wheels 31 and 33 are respectively positioned upon the rails 12 and 13, and the flanges 32 and 34 of the wheels are positioned adjacent the inner edges of the rails. At the forward end of the carriage 24 a stub shaft 35 (FIGURE 5) also projects exteriorly of the carriage 24 through a lateral side plate 26 thereof and rotatably supports a wheel 36 adapted to run on the track 12; a fourth wheel 37 is journaled to a stub shaft (not shown) at the remaining corner of the carriage 24 and is adapted to be movably supported by one of the tracks 13. The forward wheels 36 and 37 of the carriage 24 are located on the tracks 12 and 13 at positions forwardly of the bearings 16 and 17 of the shaft 18 of the drum 19, and the rear wheels 31 and 33 of the carriage are rearwardly spaced from the bearings 16 and 17 of the drum shaft 18.

A tread 38 is supported by and substantially coextensive with the upper surface of the rectangular deck 25 of the carriage 24 and the upper surface of the tread is provided with alternating longitudinal ridges 39 and valleys 40 adapted to intermesh with the fingers 23 projecting from the rearward edge of the beveled portion 22 of the stationary platform 21. The rearward portions of the rectangular deck 25 and tread 38 project horizontally beyond the rearward terminations of the lateral side plates 26 and 27 of the carriage 24. A pressure plate chassis 42, shorter in length than the carriage 24 but otherwise of similar construction, is provided with flanged wheels 43, 44, 45 and 46 rotatably supported by stub shafts, not shown, at the four corners of the chassis with the wheels positioned upon the tracks 12 and 13, and a tread member 47 coplanar with the tread 38 of the carriage 24 is carried by the pressure plate chassis but is spaced from the forward end thereof. The spacing between the forward edge of the tread 47 and the forward end of the chassis 42 upon which it is supported corresponds to the distance which the rearward portion 41 of the deck and tread 25 and 38 of the carriage extends rearwardly beyond the lateral side plates 26 and 27 thereof. As best shown in FIGURE 4, the rearward portion 41 of the deck and tread 25 and 38 of the carriage 24 is slidably received in overlapping relationship upon the forward portion of the upper surface of the pressure plate chassis 22. A hollow and rearwardly tapered step plate 48 is carried at the rearward termination of the upper surface of the pressure plate chassis 42 and a plurality of circular openings 49 each locating and confining a spherical roller 50 within the step plate 48 are formed in the upper surface thereof.

Arms 51 and 52 are integrally constructed with the carriage 24 at opposite sides thereof and project laterally outwardly and thence downwardly in opposed relationship with one another from the rectangular deck 25. Similarly, arms 53 and 54 integrally constructed with the pressure plate chassis 42 project laterally in opposed relationship away from the chassis and thence downwardly in longitudinal alignment with the arms 51 and 52 formed as part of the carriage 24. A longitudinal rod 55 is secured to one of the laterally extending arms 51 of the carriage 24 and projects rearwardly therefrom where it is received by and passes through a longitudinal opening in the corresponding laterally extending arm 53 of the pressure plate chassis 42 and a nut 56 threadedly engages the rearward end of the longitudinal rod rearwardly of the arm 53 of the pressure plate chassis 42. A helical spring 57 is positioned about the longitudinal rod 55 between the corresponding arms 51 and 53 of the carriage 24 and pressure plate chassis 42 and the spring is confined in compression between the corresponding arms 51 and 53. The corresponding laterally extending arms 52 and 54 at the other sides of the carriage 24 and pressure plate chassis 42 are likewise provided with a longitudinal rod 58 which is carried by one of the arms 52 and passes through a longitudinal opening in the other arm 54 where a nut 59 threadedly engages the rearward end of this arm. Another helical spring 60 is positioned about the second described longitudinal rod 55 between its associated laterally extending arms 52 and 54 of the carriage 24 and pressure plate chassis 42, and this spring is held in compression between the arms. Thus, the pressure plate chassis 42 is coupled to the carriage 24 at the rearward end thereof with a degree of relative longitudinal displacement permitted by the coupling; the springs 57 and 60, however, urge the carriage 24 and pressure plate chassis 42 apart and normally maintain these two members in spaced relationship with respect to one another. A trigger plate 61 is affixed to and projects rearwardly from the second described laterally extending arm 52 of the carriage 24 and a normally opened push button switch 62 having its actuating button directed toward a bearing surface of the trigger plate 61 is attached to the second described laterally extending arm 54 of the pressure plate chassis 42. The springs 57 and 60 normally maintain a spaced relationship between the actuating button of the switch 62 and the bearing surface of the trigger 61, but longitudinal displacement between the pressure plate chassis and the carriage drives the actuating button of the switch into engagement with a bearing surface of the trigger.

A mounting bracket 63 is secured to the forward end of one of the rails 12 and supports a bearing 64 which is journaled to one end of a drive shaft 65. A bevel gear 66 is secured to the drive shaft 65 exteriorly of the bearing 64 for rotation in a vertical plane about a longitudinally disposed axis. A second bearing 67 supported by the mounting bracket 63 with its axis at right angles to the axis of the drive shaft 65 receives one end of a driven shaft 68 which extends transversely across and perpendicularly to the tracks 12 and 13 and which is supported at its other end by another bearing, not shown. An end of the driven shaft 68 extends through the bearing 67 and projects laterally outwardly thereof where it is engaged by a sprocket 69; a driven bevel gear 70 having teeth adapted to intermesh with the teeth of the bevel gear 66 on the drive shaft 65 is secured on the driven shaft 68 interiorly adjacent the bearing 67 of the driven shaft. Rearwardly of the first described sprocket 69 a bearing 71 is supported by one of the vertical posts 11 and rotatably receives a stub shaft 72 (FIGURE 2) on which a second sprocket 73 is mounted in coplanar relationship with the first described sprocket 69. A sprocket chain 74 is engaged by the sprockets 69 and 73. Another pair of sprockets (not shown) are rotatably supported laterally beyond the second track 13 at positions thereon in lateral alignment with the sprockets 69 and 73; it is to be understood that one of these sprockets (not shown) is carried by the driven shaft 68 and its rotation is thus synchronized with the sprocket 69 also carried on that shaft. A second chain 75 is thus supported and driven in synchronous relationship with the first described chain 74 and the planes defined by the various links of each chain are parallel with one another. Spacer sleeves 76 are respectively positioned laterally adjacent corresponding points on the chains 74 and 75 and a roller 77 having a sprocket chain pin integrally and coaxially constructed therewith is positioned laterally adjacent each spacer sleeve with the integral pin portion of each roller passing through its corresponding spacer sleeve and through links of the adjacent sprocket chain to constitute a part thereof. A rod 78 is attached to the outer surface of one of the spacer sleeves 76 and extends rearwardly whereas a corresponding rod 79 is attached to the outer surface of the other spacer sleeve 76 and also extends rearwardly so that the rods 78 and 79 extend in parallel relationship with one another.

Cylinders 80 and 81 respectively receive the rearward extending ends of the rods 78 and 79 and within each cylinder an end portion of each rod is enlarged to dimensions exceeding openings in the forward ends of the cylinders so that the ends of the rods 78 and 79 are confined within the cylinders 80 and 81. Within each cylinder 80 and 81 a helical spring 82 is positioned between the rearward end of one of the rods 78 and 79 positioned therein and between the rearward end of the cylinder. The cylinders 80 and 81 are respectively provided with exteriorly projecting yokes 83 and 84 on their rearward ends and the yokes are respectively journaled to trunnions 85 and 86 which are attached to and project laterally from the arms 51 and 52 of the carriage 24. The extending end of the trunnion 86 connected to the arm 52 of the carriage 24 above the rail 13 is provided with a lateral projection adapted to coact with certain switches to be described.

Through the trunnions 85 and 86, yokes 83 and 84, cylinders 80 and 81 with springs 82 therein and rods 78 and 79, the carriage 42 is engaged by rollers 77 secured to the chains 74 and 75. A plurality of vertical beams 88 attached to and supported by the recessed foundation 10 are arranged in longitudinal rows spaced laterally and outwardly of the rows of vertical posts 11 and located between the sprockets 69 and 73. Inwardly facing guide channels 88 and 89 which may be constructed of conventional channel beam stock are respectively attached one above the other to each row of vertical beams and each channel member is adapted to receive and guide a roller 77 for part of its course between the sprockets 69 and 73.

A plurality of switches are held in fixed position and are engaged in a predetermined sequence by the projections 87 on one trunnion 86 of the carriage 24 or by the roller 77 attached to one of the chains 74. Without initial reference to the circuits interconnecting these switches with one another and with various driving mechanisms to be described, a description of the several switches with particular attention to their location in the construction and described in the order of their actuation is helpful in an explanation of the coactive operation of various component parts of the invention. A conventional two position toggle switch 91 is located slightly forwardly of and is laterally spaced from the projection 87 on the trunnion 86 of one arm 52 of the carriage 24, and the toggle arm 92 of this switch is positioned in the path of the projection 87 so that the circuit of the switch is completed when the toggle arm is inclined forwardly and the circuit is broken when the toggle arm is in its rearwardly inclined position. A push-button type latching switch 93 is positioned forwardly of the toggle switch 91 and has its push-button 94 positioned in the path of the projection 87. This switch is so constructed that its primary circuit is normally open but when the push button 94 is depressed the primary circuit is closed and the push button is mechanically held in its closed position; passage of current through a separate release circuit returns the push button to its normally open position. An exemplary construction for this type of switch 93 is illustrated in FIGURE 8 wherein a biasing spring 95 urges the button member 94 toward its normally open position whereas a ratchet 96 is adapted to engage the button member when the same is in its depressed position, and the ratchet, in turn, may be withdrawn from the button member 94 by the passage of an electrical current through a coil 97; movable contact points 98 and 99 carried by the button 94 engage stationary contact points 100 and 101 when the button 94 of the switch 93 is depressed. A second push button latching type switch 102, identical in construction with the switch 93 described immediately above, is positioned in the path of the roller 77 at the forwardmost position on the chain 74. The push button 103 of this switch 102 is adapted to be engaged and depressed by the roller 77. A normally closed limit switch is positioned beneath the push button latching type switch 104 with its actuating arm 105 in the path of the roller 77 carried by the chain 74 so that passage of the roller will depress the actuating lever of the limit switch 104. A normally open push button switch 106 is positioned directly beneath the rearmost sprocket 73 of the chain 74 and is there oriented with its actuating button 107 likewise in the path of the roller 77 for engagement therewith. Another normally open push button type switch 108 is located opposite the rearmost portion of the path of travel of the roller 77 carried by the chain 74 and the button 109 of this switch is likewise positioned for engagement by the roller 77.

One power line 110 of an electric motor 111 having its shaft mechanically coupled to the drive shaft 65 through a suitable gear reduction system (not shown) is wired in series with the toggle switch 91. One stationary contact point 101 of the first described push button type latching switch 93 is wired to an electrical lead 112, and the other stationary contact point 100 is wired to a second electrical lead 113, the latter of which is electrically connected to one terminal of the coil 114 of a normally closed single pole single throw relay; the first described lead 112 of the switch 93 is connected to one terminal 115 of a power source whereas the other terminal of the coil 114 of the single pole single throw relay is electrically connected to the other terminal 116 of the power source. The drive motor 117 of the tread 20 of the moving sidewalk is normally connected to the terminals 115 and 116 of the power source but that drive motor 117 is connected to the terminal 115 through the armature 118 and its contact point 119 of the single pole single throw relay. Separate sources of power which may utilize different voltages are thus provided for the motors 111 and 117 and their associated power circuits. One terminal of the release coil 97 of the push button switch 93 is connected by an electrical lead 120 to a terminal of the normally open push button switch 108 having its button 109 opposite the rearmost point of travel of the roller 77; the other terminal of this switch 108 is connected to one conductor 121 of a third power line, the other conductor 122 of which is connected to the other terminal of the release coil of the push button type latching switch 93. One of the stationary contact points of the primary circuit of the second described push button type latching switch 102 which is positioned at the forwardmost point of travel of the roller 77 is electrically connected by a lead 123 to one conductor 121 of the third power source; the other stationary contact point of that switch 102 is electrically connected by leads 124 and 125 to one terminal of the normally open push button switch 62 attached to a laterally extending arm 54 of the pressure plate chassis 42. The other contact point of the normally open push button switch 62 is connected by a lead wire 126 to one terminal of the normally closed push button switch 104. The other terminal of the normally closed push button switch 104 is connected by a lead wire 127 to one side of the coil 128 of a double pole double throw relay and the other side of the coil 128 of the double pole double throw relay is connected by an electrical lead to the second conductor 122 of the third power source. The two armatures 130 and 131 of the double pole double throw relay are adapted to make alternate contact with pairs of contact points, the first armature 130 making alternate contact with one set of contact points 132 and 133 and the second armature making alternate contact with another set of contact points 134 and 135. The two armatures of the double pole double throw relay are electrically insulated from one another but are mechanically coupled together so that they move in unison, and for purposes of the present description the illustrated positions of the armatures 130 and 131 will be considered as their normal state with the first armature 131 making electrical contact with its normally closed contact point 132 and the second armature 131 in electrical contact with its normally closed armature 134. The field coil of the motor 111 coupled to the drive shaft 65 has one of its terminals wired by an electrical lead 136 to the normally open contact point 132 of the first armature 130 of the double pole double throw relay and also wired to the normally open contact point 135 of the second armature 131 of the relay. The other terminal of the field coil of the motor 111 is wired by a lead 137 to the normally open contact point 133 of the first armature 130 of the double pole double throw relay and is also wired to the normally closed contact point 134 of the second armature 131 of that relay. The second armature 131 of the double pole double throw relay is electrically connected to one conductor 110 of the power source of the motor 111 through the toggle switch 191. The first armature 130 of the double pole double throw relay is connected by an electrical lead 139 to the other conductor of the power source of the motor 111. One terminal of the release coil of that push button type latching switch 102 located at the forward extremity of the chain 74 is electrically connected by a lead wire 140 to the second conductor 122 of the third power source; the other terminal of the release coil of that switch 102 is connected by a lead 141 to one terminal of the normally open push button switch 106 located beneath the rearmost sprocket 73 of the chain 74 and the other terminal of the last named switch 106 is electrically connected by a lead 142 and through another lead 124 to the second terminal of the primary circuit of the latching type push button switch 102 positioned at the forward limit of travel of the roller 77.

In operation, it will be assumed that the tread 20 of the moving sidewalk is in motion and rotates the drum 19 in a clockwise direction with reference to FIGURE 2 and that the roller 77 attached to the chain 74 is positioned above the rearmost sprocket 73 of that chain. Passengers leaving the moving sidewalk step from the moving tread 20 onto the normally stationary treads 38 and 47 supported by the pressure plate chassis and the carriage 42 and 24. Should a passenger's timing be faulty his foot will normally be lifted from the moving tread 20 by the step plate 48 and the spherical rollers carried therein will minimize friction against the step plate and lessen any tendency of foot contact to push the step plate forwardly. If, however, a passenger's foot or clothing should become lodged or entangled between the step plate 48 and the moving tread 20 the pressure plate chassis 42 will be pushed forwardly and its wheels 43 through 46 will advance upon the tracks 12 and 13 while the springs 57 and 60 about the longitudinal rods 55 and 58 will be compressed between the lateral arms 51 through 54 of the pressure plate chassis and carriage 42 and 24. As the springs 57 and 60 are compressed the bearing surface of the trigger member 61 depresses the button of the normally open switch 62, but actuation of this switch has no effect at this time because one of its leads 125 finds no current path through either of the normally open switches 102 and 106 to which it is connected. Compression of the springs 57 and 60 and actual abutment between the pressure plate chassis 42 and the carriage 24 urge the carriage forwardly along the tracks 12 and 13 and against compression of the springs 82 positioned within the cylinders 80 and 81 and compressed against the rearward ends of the rods 78 and 79 which are held at their forward ends by the sleeves 76 and rollers 77 attached to chains 74 and 75; the cylinders 80 and 81 slide forwardly on the rods 78 and 79 as the carriage 24 is pushed forwardly. By choosing springs 57, 60 and 82 with appropriate compressive strength, appreciable forward advancement of the carriage 24 can be made to depend upon the exertion of more longitudinal pressure upon the step plate 48 than will be encountered in normal use of a moving sidewalk, but at the same time the carriage may be made to yield longitudinally to pressures of a lower order than would be required to do bodily injury to a passenger having his person or clothing caught between the moving tread 20 and the step plate 48. As the carriage 24 is forced along the tracks 12 and 13 the projection 87 attached to one of the trunnions 86 of the carriage engages and throws the arm 92 of the toggle switch 91; the toggle switch 91 is thus closed and the motor 111 mechanically coupled to the drive shaft 65 is connected to its source of electrical power. The drive shaft 65 turns the sprocket 69 through the intermeshing bevel gears 66 and 70 and the opposite member (not shown) of the sprocket 69 is turned in unison therewith by the shaft 68. The chains 74 and 75 are consequently set in motion and the carriage 24 is drawn forwardly by the rods 78 and 79 carried by the chains; the longitudinal rods 55 and 58 pull the pressure plate chassis 42 forwardly with the carriage 42. The speed at which the carriage 24 and pressure plate chassis 42 are carried forwardly by the chains 74 and 75 is preferably identical to the speed of the moving tread 20 so that a person may be given the opportunity to disentangle clothing caught between the step plate 48 and the moving tread 20 when there is no relative motion between these members and before the clothing might otherwise be torn by mechanical assistance to the disengagement. With continued forward progress of the carriage 24 the projection 87 on its trunnion 86 engages the button 94 of the latching type switch 93 and depresses the same so that it is mechanically held by the ratchet 96 until such time as the ratchet is disengaged by a flow of electrical current through the disengaging coil 97 of that switch. Closure of the switch 93 connects the coil 114 of the normally closed single pole single throw relay with the power source of the motor 117 which drives the moving tread 20 and attraction of the armature 118 of this relay by the coil 114 breaks the circuit of this motor and stops the moving tread 20 of the sidewalk. The carriage 24 and pressure plate chassis 42 continue to be driven forwardly by the chains 74 and 75, however, and relative motion such as will promote disentanglement of a passenger from the sidewalk is imparted to the step plate 48 and moving tread 20. With the moving tread 20 now interrupted in its motion the carriage 24 and pressure plate chassis 42 continue to advance until the roller 77 is carried to the forward limit of its travel upon the chain 74. It should be noted that the roller travels most of its course within the guide channels 88 and 89 and that ambient oscillations of the rods 78 and 79 are prevented. At its forward extreme of travel the roller 77 engages the button 103 of the latching type switch 102 and depresses the same where it is mechanically held and its primary circuit is closed. With the primary circuit of the switch 102 closed a current path is completed for the switch 62 carried by a lateral arm 54 of the pressure plate chassis 42 and that current path may be traced through the second conductor 122 of the third power source to the coil 128 of the double pole double throw relay through its conductor 129 and thence through the coils of the other lead 127 through the normally closed switch 104 and thence by an electrical lead 126 to one terminal of the switch 62; the other terminal of the switch 62 is connected by leads 124 and 125 and through the now closed primary circuit of the latching switch 102 to the first conductor 121 of the third power source. From the foregoing it will be seen that the closing of the switch 102 connects the coil 128 of the double pole double throw relay to the third power source through the switch 62 carried by the arm 54 of the pressure plate chassis. By this connection through the latching type switch 102 the armatures 130 and 131 of the double pole double throw relay are thrown to their normally open contact points when the bearing surface of the trigger member 61 depresses the button of the switch carried with the pressure plate chassis. In their thrown positions the armatures of the double pole double throw relay reverse the normal connections of the field coil of the motor 111 which drives the chains 74 and 75 and the direction of rotation of the motor as well as the direction of motion of the chains is reversed. After the latching type switch 102 is depressed the pressure plate chassis 42 acts as a sensing device, when urged forwardly toward the carriage 24 against pressure of the springs 57 and 60, reverses its motor 111 unless an obstruction is removed from its path. Before there is any appreciable rearward motion of the carriage 24, however, the roller 77 engages and then passes the actuating arm 105 of the normally closed push button switch 104 positioned beneath the latching type push button switch 102. It will be seen that the circuit of the coil 128 of the double pole double throw relay is in series with this normally closed switch 104 and that the circuit of the coil of the double pole double throw relay is temporarily interrupted while the roller engages the actuating lever 105 of this normally closed switch. More rearward motion of the carriage 24 is required to depress the button of the switch 62 attached to the pressure plate chassis than is required to carry the roller 77 past the actuating lever 105 of the normally closed switch 104. With the roller 77 carried by the chain 74 past the actuating arm 105 of the normally closed switch 104, longitudinal pressure applied to the step plate 48 will close the switch 62 by the pressure plate chassis and reverse the motor 111 driving the chains 74 and 75 until relief from such pressure causes the springs 57 and 60 to urge the pressure plate chassis away from the carriage 24 and to break the circuit of the switch 62 which in turn breaks the circuit of the coil 128 of the double pole double throw relay and permits the same to return to its normal position whereby the motor 111 returns to its normal direction of rotation. Hence, the step plate 48 will exert only a limited pressure upon any obstruction in its path and will then oscillate longitudinally until the obstruction is removed. If, however, a longitudinal force is maintained against the step plate 48 the motor 111 will withdraw the carriage 24 and pressure plate chassis 42 until the roller 77 once again depresses the actuating lever of the normally closed switch 104 at which point the carriage and pressure plate chassis will remain and oscillate longitudinally until the force is removed from the step plate 48. Assuming there is no obstruction in the path of the step plate 48 as it returns to its original position driven by the rods 78 and 79 carried by the chains 74 and 75, the projection 87 on a trunnion 86 of the carriage 24 once again passes by the latching type switch 93 adjacent its path, but it will be remembered that this switch is still held mechanically in its closed position and the passing projection 87 has no effect upon its state. As the roller 77 continues along its course with the chain 74, it engages the actuating button 107 of the switch 106 positioned beneath the rearmost sprocket 73 of the chain 74 and closing of this switch 106 completes the release circuit of the second described latching type push button switch 102 which in turn interrupts the current path of the switch 62 located on a lateral arm 84 of the pressure plate chassis 42; closing of the switch 106 thus discontinues the sensing function of the step plate 48 and pressure plate chassis 42.

Before the roller 77 reaches the rearmost point in its path, the projection 87 on a lateral arm 54 of the pressure plate chassis 42 engages and throws the arm 92 of the toggle switch 91 to its open position and the circuit of the motor 111 which drives the chain 74 is broken. Momentum of the pressure plate chassis 42 and the carriage 24 as well as the motor 111 itself carries the roller to and beyond the rearmost point in its course, but this momentum is insufficient to bring the projection 87 of the pressure plate chassis back into engagement with the arm 92 of the toggle switch 91. At its rearmost position the roller 77 engages the actuating button 109 of the switch 108 located opposite that position, and closing of this switch completes the release circuit of the first described latching type push button switch 93 so that the release coil 97 thereof withdraws the ratchet 96 which holds the button member 94 in its depressed position; the biasing spring 95 of this switch 93 returns its push button 94 to its normally open position, and the circuit of the coil 114 of the single pole single throw relay is thus broken to permit the armature 118 of the relay to return to its normally closed position. Hence, the circuit of the motor 117 which drives the moving tread 20 is completed through the armature 118 and its contact point 119, and operation of the moving sidewalk commences once again.

Auxiliary manual means, indicated by a dotted line 143 in FIGURE 7, may be incorporated in the construction of the double pole double throw relay to permit overriding commands for manipulation of the carriage 24 and pressure plate chassis 42 so that an attendant may assist an entangled passenger who is neither being injured by nor released from the invention in its automatic operation. By hand, such as at 144, an attendant may manipulate a lever 143 or other control system mechanically connected to the armatures 130 and 131 of the double pole double throw relay and thus operate the motor 111 in its normal or reverse directions or discontinue operation of the motor altogether by placing the armatures in a neutral position.

In an alternate form of construction, as illustrated in FIGURE 6, a forward side 145 is provided on the carriage 24 and a yoke 143 adapted for displacement in a horizontal plane is connected to the forward side and attaches a single cylinder 147 and a rod 148 to the carriage. The path of the chain 149 in this embodiment of the invention is that of a closed and horizontally disposed L with a single rearward sprocket 150 conducting the chain 149 to a second sprocket in longitudinal alignment with the first and a third sprocket 152 laterally and rearwardly positioned with respect to the second. From the second sprocket 151 the chain is conducted laterally to a fourth sprocket 153 and thence counterlaterally to the third sprocket 152 from which it continues rearwardly to the first sprocket 150. The fourth sprocket 153 is coaxially engaged by a beveled ring gear 154 engaged by a bevel gear 66 as described in the preferred form of the invention. In the alternate form of construction, a roller 155 is constructed as previously described for the roller 77 and is carried along the upper side of the chain 149. The end of the rod 148 adjacent the roller 155 is bent downwardly to permit passage of the single rod 148 above the various switches. A pause is mechanically imparted to the carriage 24 and pressure plate chassis 42 at the forward limit of their travel in this form of the invention, and a passenger on the sidewalk is given the benefit of an extended period of time when both the moving tread 20 and the step plate 48 are without significant motion. The sequence of engagement of the various switches is not modified by this feature.

Those skilled in the art will recognize that the selection of particular switches and circuits may be varied by economic considerations; purely electrical latching circuits, for instance, could be substituted for the partially mechanical latching systems disclosed herein. The invention is not limited to the exemplary construction herein shown and described, but may be made in various ways within the scope of the appended claims.

What is claimed is:

1. In a moving sidewalk, a landing slidably mounted for longitudinal displacement in the direction of said sidewalk and positioned in overlapping relationship with an exit end of said sidewalk, a normally inactive reciprocating drive means engaging said landing for longitudinal reciprocation thereof at the moving rate of said sidewalk, a normally open switch positioned adjacent said landing and wired in series with said drive means and having its actuating arm extending into the path of said landing.

2. The invention as defined in claim 1 and including a nomally closed switch wired in series with the drive motor of said moving sidewalk and having its actuating arm intersecting the path of said landing.

3. The invention as defined in claim 2 and wherein the said normally open switch and said normally closed switch are each two position toggle switches with the toggle arms of said switches extending into the path of said landing.

4. In a landing for a moving sidewalk, a tread supporting carriage positioned adjacently above an end portion of said sidewalk and slidably supported for longitudinal displacement adjacent the tread of said sidewalk, a pressure plate chassis positioned adjacently above said end portion of said sidewalk and connected to said carriage by a resilient coupling, normally inactive reciprocating drive means engaging said carriage for longitudinal reciprocation thereof at the moving rate of said moving sidewalk, a normally open switch wired in series with said reciprocating drive means and having its actuating arm positioned in the path of said carriage, a normally closed latching switch wired in series with the drive motor of said moving sidewalk and having its actuating arm positioned in the path of said carriage at a position forwardly of said actuating arm of said normally open switch with respect to the normal direction of transport of said sidewalk, and means unlatching said normally closed latching switch when said carriage is at its rearwardmost position with respect to said direction of transport of said sidewalk.

5. The invention as defined in claim 4 and including a normally open push button switch positioned between said carriage and said chassis, a normally open latching switch wired in series with said push button switch and having its actuating arm positioned in the path of said carriage at its forwardmost position with respect to the direction of transport of said sidewalk, means responsive to completion of the series circuit of said push button switch and said normally open latching switch reversing said reciprocating drive means of said carriage, and means unlatching said normally open latching switch when said carriage reaches its rearwardmost position with respect to the direction of transport of said sidewalk.

6. The invention as defined in claim 5 and including means interrupting said series ciruit of said push button switch and said normally open latching switch when said carriage is positioned at its forwardmost position with respect to the direction of transport of said sidewalk.

7. In a moving sidewalk, a longitudinally slidable tread positioned adjacently above said sidewalk near the exit end thereof, powered means reciprocating said tread at substantially the moving rate of said sidewalk, a normally open switch adapted to energize said powered means upon closure of said normally open switch and having its actuating arm in the path of said tread, and a normally closed switch wired in series with the drive motor of said sidewalk and having its actuating arm located in the path of said tread forwardly of said actuating arm of said normally open switch with respect to direction of transport of said sidewalk.

References Cited in the file of this patent

UNITED STATES PATENTS 2,030,103    Dunlop _____ Feb. 1, 1936

FOREIGN PATENTS 767,431    France _____ May 1, 1934